US012800447B2

(12) United States Patent
Packingham et al.

(10) Patent No.: US 12,800,447 B2
(45) Date of Patent: Nov. 17, 2026

(54) AEROSOL COLLECTORS WITH REMOVABLE INLET ASSEMBLY

(71) Applicant: INNOVAPREP LLC, Drexel, MO (US)

(72) Inventors: Zachary A. Packingham, Drexel, MO (US); Steven D. Graham, Drexel, MO (US); Sidney J. Spry, Lexington Park, MD (US); Dale D. Polson, Duluth, GA (US)

(73) Assignee: InnovaPrep LLC, Drexel, MO (US)

( * ) Notice: Subject to any disclaimer, the term of this patent is extended or adjusted under 35 U.S.C. 154(b) by 767 days.

(21) Appl. No.: 17/841,563

(22) Filed: Jun. 15, 2022

(65) Prior Publication Data

US 2022/0397494 A1 Dec. 15, 2022

Related U.S. Application Data

(60) Provisional application No. 63/210,954, filed on Jun. 15, 2021.

(51) Int. Cl.
*G01N 1/22* (2006.01)
*G01N 1/24* (2006.01)

(52) U.S. Cl.
CPC ......... *G01N 1/2205* (2013.01); *G01N 1/2273* (2013.01); *G01N 1/24* (2013.01); *G01N 2001/245* (2013.01)

(58) Field of Classification Search
CPC ...... B03C 3/32; G01N 1/2205; G01N 1/2273; G01N 1/24; G01N 2001/245
(Continued)

(56) References Cited

U.S. PATENT DOCUMENTS 4,675,034 A * 6/1987 Lynch .................. G01N 1/2205 55/504
4,737,171 A * 4/1988 Courbon .............. G01N 1/2205 55/332
(Continued)

FOREIGN PATENT DOCUMENTS

JP 240212 A 2/1990
JP 2000230890 A 8/2000
(Continued)

OTHER PUBLICATIONS

Rodriquez, Kari, International Search Report, Written Opinion, Sep. 21, 2022, 8 pages, International Searching Authority/United States, Alexandria, Virginia, United States of America.
(Continued)

*Primary Examiner* — Nathaniel T Woodward
(74) *Attorney, Agent, or Firm* — Coughlin Law Office, LLC; Stuart M. Aller; Daniel J. Coughlin

(57) ABSTRACT

The present subject disclosure discloses devices, systems, and methods related to collection and recovery of Aerosols and Bioaerosols for analysis. The system includes an omni-directional inlet assembly that is easily removed for decontamination and can be replaced with an already clean inlet assembly or with directional inlets or other tools for collection from animal breathing zones, air ducts, air nearing moving vehicles and other sampling scenarios. Further, the system includes other features that enable the device to be lower in cost than other similar systems while providing improved usability and performance.

20 Claims, 12 Drawing Sheets

(58) Field of Classification Search
USPC ........................................................ 73/863.23
See application file for complete search history.

(56) References Cited

U.S. PATENT DOCUMENTS

| | | | |
|---|---|---|---|
| 5,040,424 A | 8/1991 | Marple et al. | |
| 6,062,392 A * | 5/2000 | Birmingham | B01D 45/08 95/32 |
| 6,857,328 B1 * | 2/2005 | Spurgeon | G01N 1/2226 73/863.23 |
| 7,651,543 B1 | 1/2010 | Marple et al. | |
| 2003/0008341 A1 * | 1/2003 | Spurrell | G01N 1/2208 435/287.1 |
| 2004/0045376 A1 | 3/2004 | Van Netten | |
| 2005/0081653 A1 | 4/2005 | Arabian et al. | |
| 2006/0000297 A1 | 1/2006 | Gussman et al. | |
| 2006/0144025 A1 | 7/2006 | Vallayer et al. | |
| 2010/0225918 A1 * | 9/2010 | Aiken | G01M 15/108 356/438 |
| 2016/0363515 A1 | 12/2016 | Ligugnana et al. | |
| 2018/0172561 A1 * | 6/2018 | Kocher | G01N 1/2273 |
| 2020/0049598 A1 * | 2/2020 | Miller-Lionberg | G01N 1/2202 |
| 2020/0348217 A1 * | 11/2020 | Page | G01N 1/2273 |

FOREIGN PATENT DOCUMENTS

| | | |
|---|---|---|
| JP | 2006526401 A | 11/2006 |
| JP | 2010094617 A | 4/2010 |
| JP | 2013011611 A | 1/2013 |
| JP | 2018105874 A | 7/2018 |
| WO | 2003081212 A2 | 10/2003 |
| WO | 2012120140 A1 | 9/2012 |

OTHER PUBLICATIONS

Dekker, Derk, European Search Report, Supplementary European Search Report, Jan. 31, 2025, 12 pages, European Patent Office, Munich, Germany.

Olof Beck et al., Portable Sampling Device and Method for Sampling Drug Substances from Exhaled Breath, machine translation of JP2018105874A, Jul. 5, 2018, 16 pages, Google Patents, https://patents.google.com/patent/JP2018105874A/en?oq=JP+2018105874.

Baajiru Ee Maapuru et al., Inlet device for pm10 sample and sample device, machine translation of JP240212A, 9 pages, Google Patents, https://patents.google.com/patent/JPH0240212A/en?oq=JP240212A.

Miyashita Noe et al., Method for using detection object collection implement, machine translation of JP2013011611A, Jan. 17, 2013, 19 pages, Google Patents, https://patents.google.com/patent/JP2013011611A/en?oq=JP2013011611A.

Sadayoshi Taketsuna et al., Filter Unit, machine translation of 2010094617, Apr. 30, 2010, 7 pages, Google Patents, https://patents.google.com/patent/JP2010094617A/en?oq=JP2010094617A.

Goto Yukio et al., Test liquid preparation method for allergen measurement and test liquid preparation apparatus for allergen measurement, machine translation of JP2000230890A, 13 pages, Google Patents, https://patents.google.com/patent/JP2000230890A/en?oq=JP2000230890A.

Bertin Technologies SAS, Equipment for the collection and separation of particles and microorganisms present in the atmosphere, machine translation of JP2006526401A, 8 pages, Google Patents, https://patents.google.com/patent/JP2006526401A/en?oq=JP2006526401A.

* cited by examiner

AEROSOL COLLECTORS WITH REMOVABLE INLET ASSEMBLY

This Patent application claims priority to U.S. Provisional Patent Application Ser. No. 63/210,954, filed Jun. 15, 2021, the content of which is hereby incorporated by reference herein in its entirety into this disclosure.

BACKGROUND OF THE SUBJECT DISCLOSURE

Field of the Subject Disclosure

The subject disclosure relates generally to the field of aerosol and bioaerosol collection. More particularly, the subject disclosure relates to devices, systems, and methods for capturing bacteria, virus, fungus and other microorganisms suspended in air for subsequent analysis using classical and modern rapid microbiological methods.

Background of the Subject Disclosure

The need for quickly and effectively air sampling is growing across all industries including, but not limited to, food processing, pharmaceutical manufacturing, military and intelligence communities, and any other venue in which the detection of target samples of particulates in the air is important or critical to the proper function of the operations within that venue.

SUMMARY OF THE SUBJECT DISCLOSURE

The present disclosure addresses the shortcomings of conventional systems and advances the art by providing a low-cost device with swappable, conductive plastic, omni-directional and directional inlets and other sampling tools.

The present subject disclosure discloses devices, systems, and methods related to collection and recovery of Aerosols and Bioaerosols for analysis. The system includes a modular omni-directional inlet assembly that is easily removed for decontamination and can be replaced with an already clean inlet assembly or with directional inlets or other tools for collection from animal breathing zones, air ducts, air nearing moving vehicles and other sampling scenarios that will be well known to those skilled in the art. Further, the system includes other innovative features to enable the device to be lower cost than other similar systems while providing improved usability and performance.

The disclosed system includes a low-cost aerosol collector device that uses a modular flat filter assembly to collect particles of interest from air for subsequent analysis. The flat filter assembly can include, for example, the present Applicant's (INNOVAPREP LLC) Bobcat Rapid Filter Elution Kit or Joint Biological Tactical Detection System (JBTDS) elution kit. These kits use a low pressure drop electret filter to efficiently capture particles from air for subsequent elution using Wet Foam Elution process (INNOVAPREP).

The disclosed low-cost aerosol collector device includes a ¼-turn omni-directional inlet assembly that is easily removed by the user. This feature allows users to collect a sample onto a filter and then remove the inlet assembly and then the filter for subsequent elution and analysis of the sample. A new filter may then be placed into the sampler and the inlet may be replaced with a second inlet assembly or the original inlet assembly may be cleaned and decontaminated prior to replacement. This significantly reduces hands on cleaning time and the potential for cross contamination between samples. Further, the omni-directional inlet may also be replaced with directional and other sampling tools as necessary.

Further, the aerosol collector contains a fan and controls, which are contained in an injection molded housing and a separate inlet assembly, or assemblies, which are made up of injection molded conductive plastic components. This design enables the entire inlet flow path up to the filter to be made from injection molded conductive plastic components. In this way the inlet assembly does not readily build up electrostatic charges and thus can significantly reduce losses of particles to the inlet surfaces upstream of the filter. Further, by manufacturing the inlet components from injection molded conductive plastic components rather than metal components, the overall cost and weight of the collector are both significantly reduced.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION OF THE SUBJECT DISCLOSURE

In an exemplary embodiment, the present subject disclosure is a low-cost aerosol collector device that uses a modular flat filter assembly to collect particles of interest from air for subsequent analysis. The subject disclosure relates generally to the field of aerosol and bioaerosol collection. More particularly, the subject disclosure relates to devices, systems, and methods for capturing bacteria, virus, fungus and other microorganisms suspended in air for subsequent analysis using classical and modern rapid microbiological methods.

The aerosol collector device uses a modular flat filter assembly to collect particles of interest from air for subsequent analysis. The flat filter assembly can include the Applicant's (INNOVAPREP LLC) Bobcat Rapid Filter Elution Kit or Joint Biological Tactical Detection System (JBTDS) elution kit. These kits use a low pressure drop electret filter to efficiently capture particles from air for subsequent elution using the INNOVAPREP Wet Foam Elution process.

The collector can be used for applications such as environmental monitoring, industrial hygiene applications, public health monitoring including disease outbreak monitoring and monitoring in health care facilities, animal health monitoring, food safety monitoring, pharmaceutical facility monitoring, metagenomics studies, biodefense and bioterrorism detection, and other similar applications.

The disclosed low-cost aerosol collector device includes a ¼-turn omni-directional inlet assembly that is easily removed by the user. This feature allows users to collect a sample onto a filter and then remove the inlet assembly and then the filter for subsequent elution and analysis of the sample. A new filter may then be placed into the sampler and the inlet may be replaced with a second inlet assembly or the original inlet assembly may be cleaned and decontaminated prior to replacement. This significantly reduces hands on cleaning time and the potential for cross contamination between samples. Further, the omni-directional inlet may also be replaced with directional and other sampling tools as necessary.

Further, the aerosol collector contains a fan and controls which are contained in an injection molded housing and a separate inlet assembly, or assemblies, which are made up of injection molded conductive plastic components. This design enables the entire inlet flow path up to the filter to be made from injection molded conductive plastic components. In this way the inlet assembly does not readily build up electrostatic charges and thus can significantly reduce losses of particles to the inlet surfaces upstream of the filter. Further, by manufacturing the inlet components from injection molded conductive plastic components rather than metal components the overall cost and weight of the collector are both significantly reduced.

In the following figures, there will be shown and described multiple configurations of the disclosed aerosol collector device.

Figure 1:
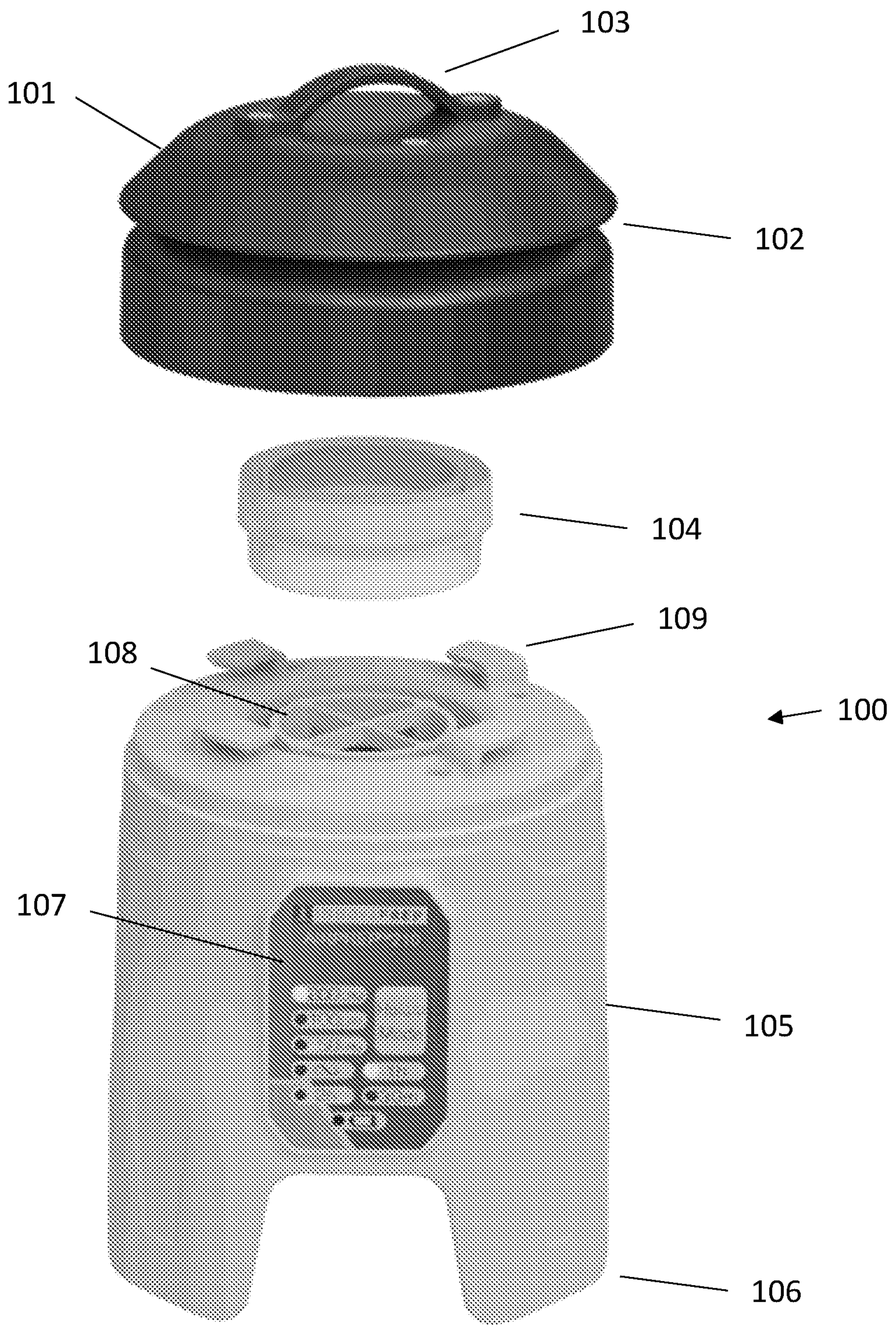
FIG. 1 shows a front perspective view of an aerosol collector with collection filter and removable omni-directional inlet assembly detached from the collector body, according to an exemplary embodiment of the present subject disclosure.

FIG. 1 shows a front view of an aerosol collector 100 with a modular collection filter 104 and modular, removable omni-directional inlet assembly 101 detached from the collector body 105, according to an exemplary embodiment of the present subject disclosure.

Aerosol Collector 100 is made of removable omni-directional inlet assembly 101 and collector body 105 and uses filter 104 for collection of aerosol and bioaerosols. Removable omni-directional inlet assembly 101 contains hang loop 103 and inlet opening 102. Collector body 105 contains four legs 106, user interface 107, filter seat 108, and a number of inlet assembly clips 109 (four shown in this example).

To use aerosol collector 100, the user inserts filter 104 into filter seat 108 and attaches the removable omni-directional inlet assembly 101 to the collector body 105. The attachment is performed by pushing removable omni-directional inlet assembly 101 onto the collector body 105 and turning it approximately ¼-turn clockwise to engage the four inlet assembly clips 109 into four pockets in the bottom of the removable omni-directional inlet assembly 101.

User interface 107 is then utilized to initiate a collection run. The aerosol Collector 100 can be set with the user interface 107 to collect at one of several flow rates, and one of several run times, or for continuous run. A battery indicator is used to signal the charge state of the onboard battery when appropriate.

After the collection period is complete, aerosol collector 100 will turn off automatically or the user may utilize user interface 107 to manually end the collection run. At that time, the user may grasp the collector body 105 in one hand and the removable omni-directional inlet assembly 101 in the other hand and turn it approximately ¼-turn counterclockwise to disengage the four inlet assembly clips 109 from the four pockets in the bottom of the removable omni-directional inlet assembly 101. The removable omni-directional inlet assembly 101 can then be lifted away from collector body 105 and filter 104 may be removed. Filter 104 may then be extracted or analyzed.

Figure 2:
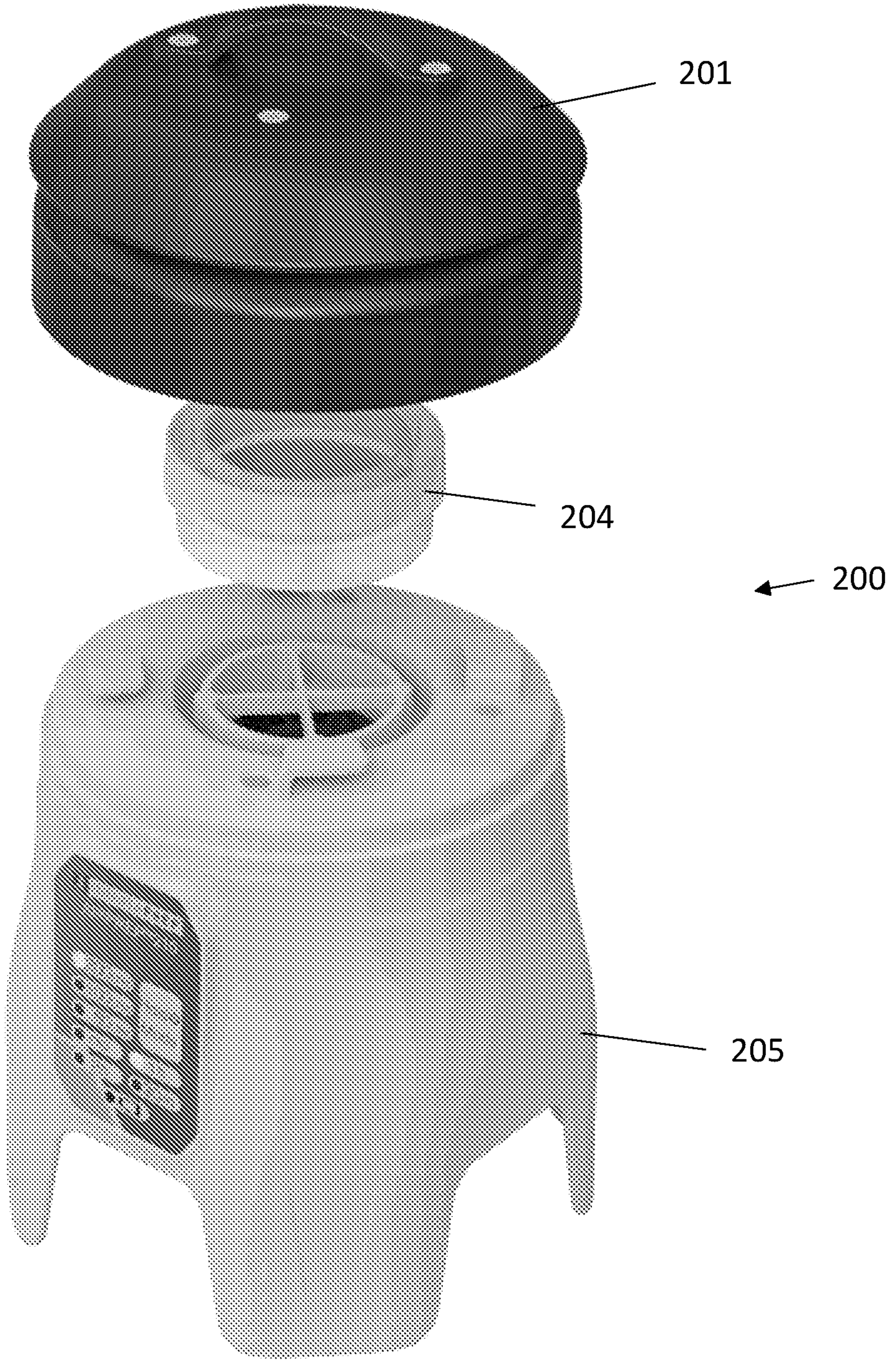
FIG. 2 shows a left side perspective view of an aerosol collector with collection filter and removable omni-directional inlet assembly detached from the collector body, according to an exemplary embodiment of the present subject disclosure.

FIG. 2 shows a left-hand side view of an aerosol collector 200 with collection filter 204 and removable omni-directional inlet assembly 201 detached from the collector body 205, according to an exemplary embodiment of the present subject disclosure.

Figure 3:
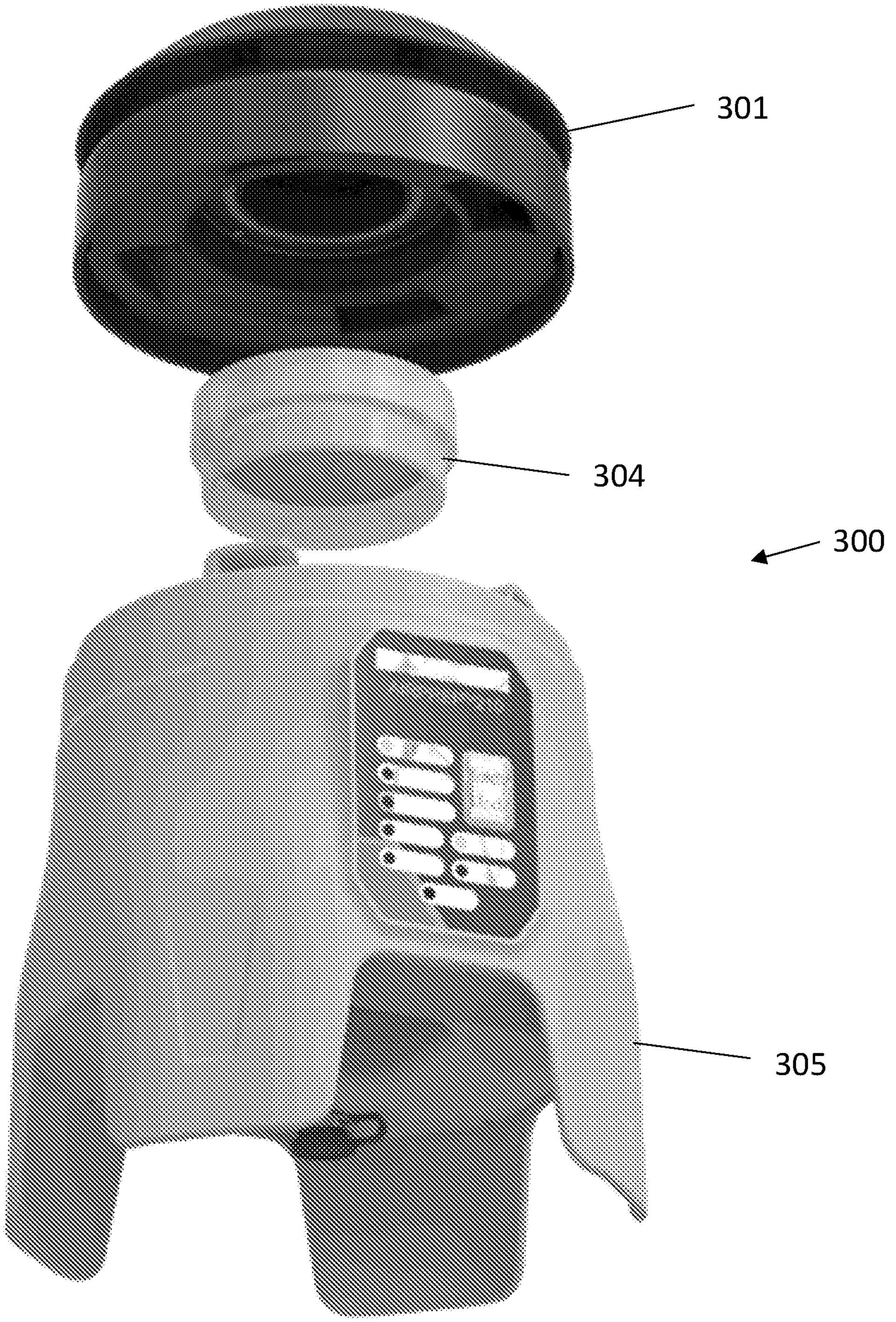
FIG. 3 shows a right side perspective view of an aerosol collector with collection filter and removable omni-directional inlet assembly detached from the collector body, according to an exemplary embodiment of the present subject disclosure.

FIG. 3 shows a right-hand side view of an aerosol collector 300 with collection filter 304 and removable omni-directional inlet assembly 301 detached from the collector body 305, according to an exemplary embodiment of the present subject disclosure.

Figure 4:
FIG. 4 shows a left side perspective view of an aerosol collector with removable omni-directional inlet assembly attached to the collector body, according to an exemplary embodiment of the present subject disclosure.

FIG. 4 shows a left-hand side view of an aerosol collector 400 with removable omni-directional inlet assembly 401 attached to the collector body 402, according to an exemplary embodiment of the present subject disclosure.

Figure 5:
FIG. 5 shows a front view of an aerosol collector with removable omni-directional inlet assembly attached to the collector body, according to an exemplary embodiment of the present subject disclosure.

FIG. 5 shows a front view of an aerosol collector 500 with removable omni-directional inlet assembly 501 attached to the collector body 502, according to an exemplary embodiment of the present subject disclosure.

Figure 6:
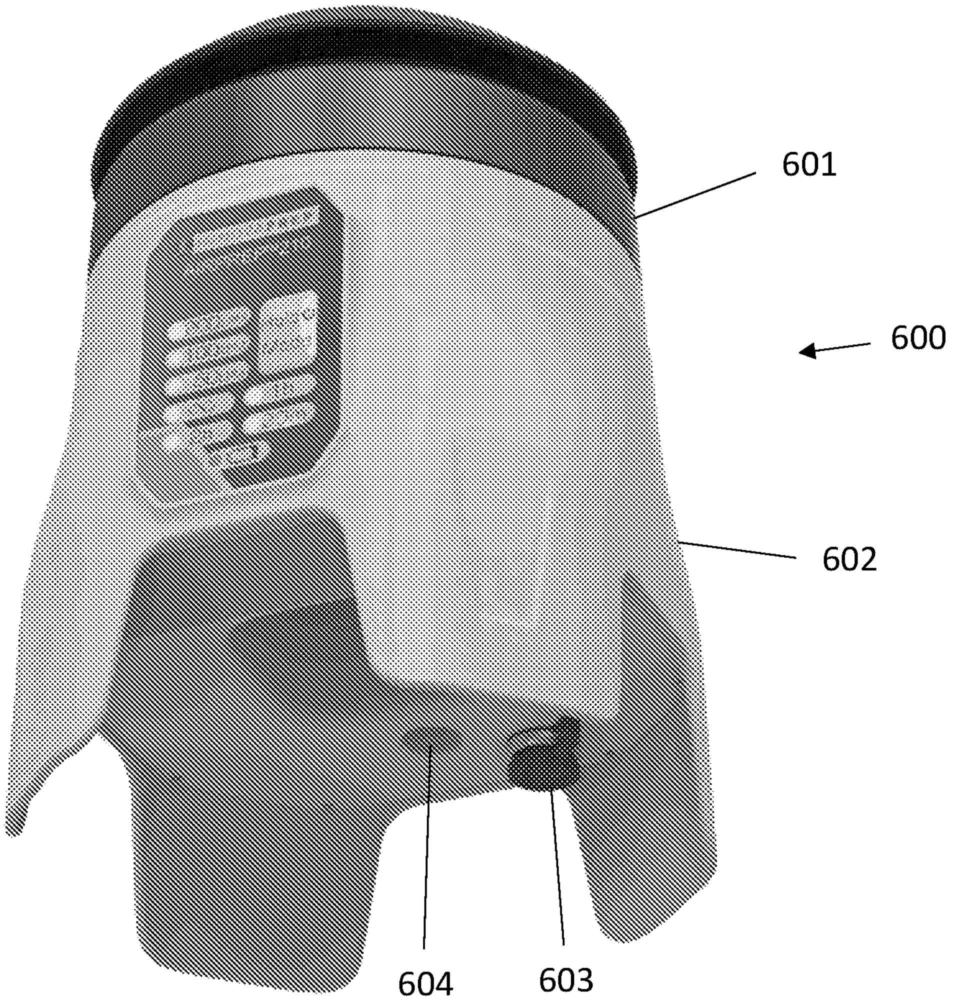
FIG. 6 shows a bottom perspective view of an aerosol collector with removable omni-directional inlet assembly attached to the collector body, according to an exemplary embodiment of the present subject disclosure.

FIG. 6 shows a front and partial bottom view of an aerosol collector 600 with removable omni-directional inlet assembly 601 attached to the collector body 602, according to an exemplary embodiment of the present subject disclosure. Connector 603 provides a port for connection of a power supply. Port 604 provides a threaded insert for attachment of a tripod.

Figure 7:
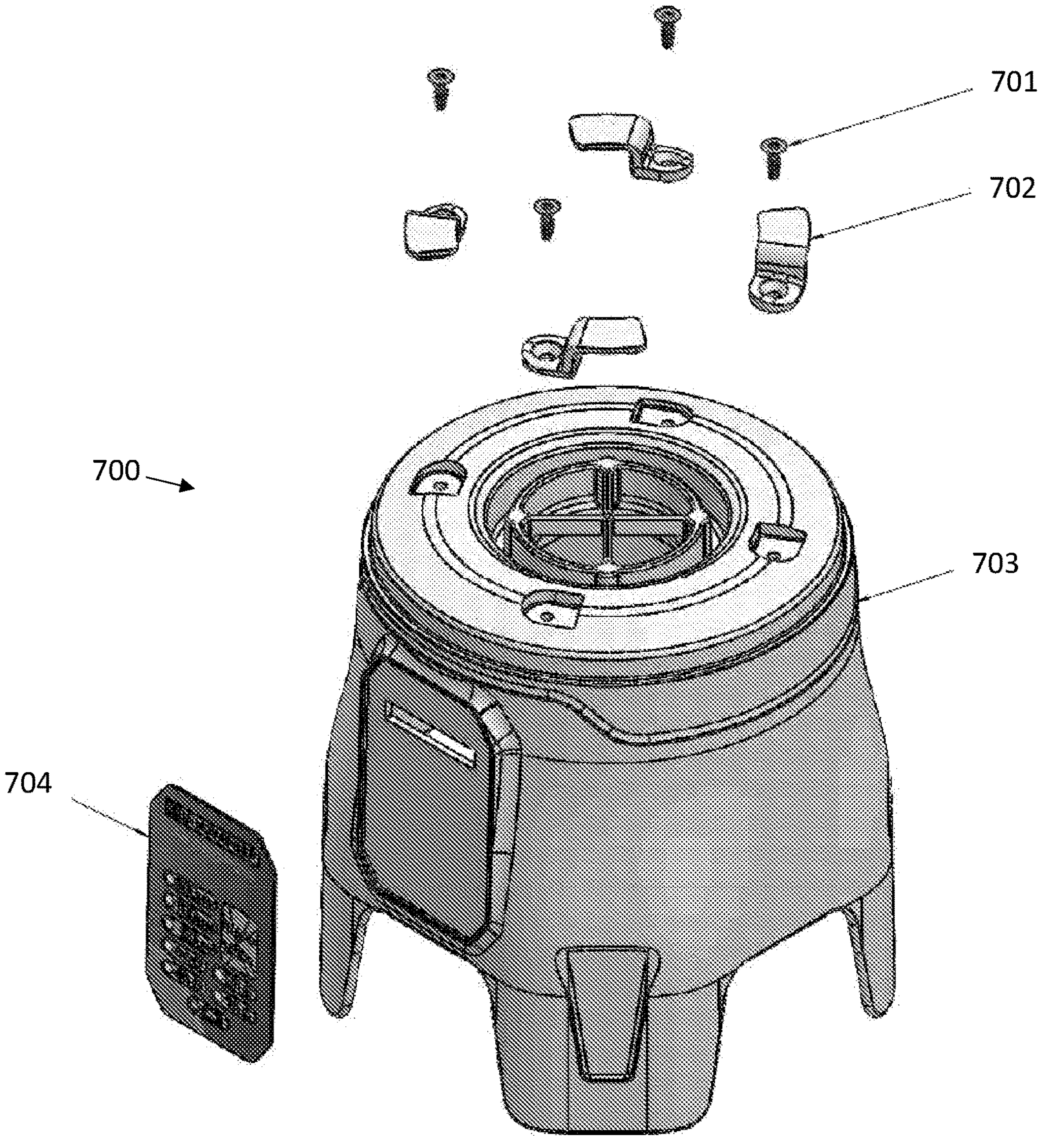
FIG. 7 shows an exploded view of a left side perspective view of an aerosol collector with clips used for attachment of a removable omni-directional inlet assembly, according to an exemplary embodiment of the present subject disclosure.

FIG. 7 shows a partial exploded view of a left-hand side view of an aerosol collector 700 with clips 702 used for attachment of a removable omni-directional inlet assembly, according to an exemplary embodiment of the present subject disclosure. Collector body 703 contains four clips 702 that are attached to the collector body 703 with four screws 701. User interface 704 is bonded to the front of collector body 703.

Figure 8:
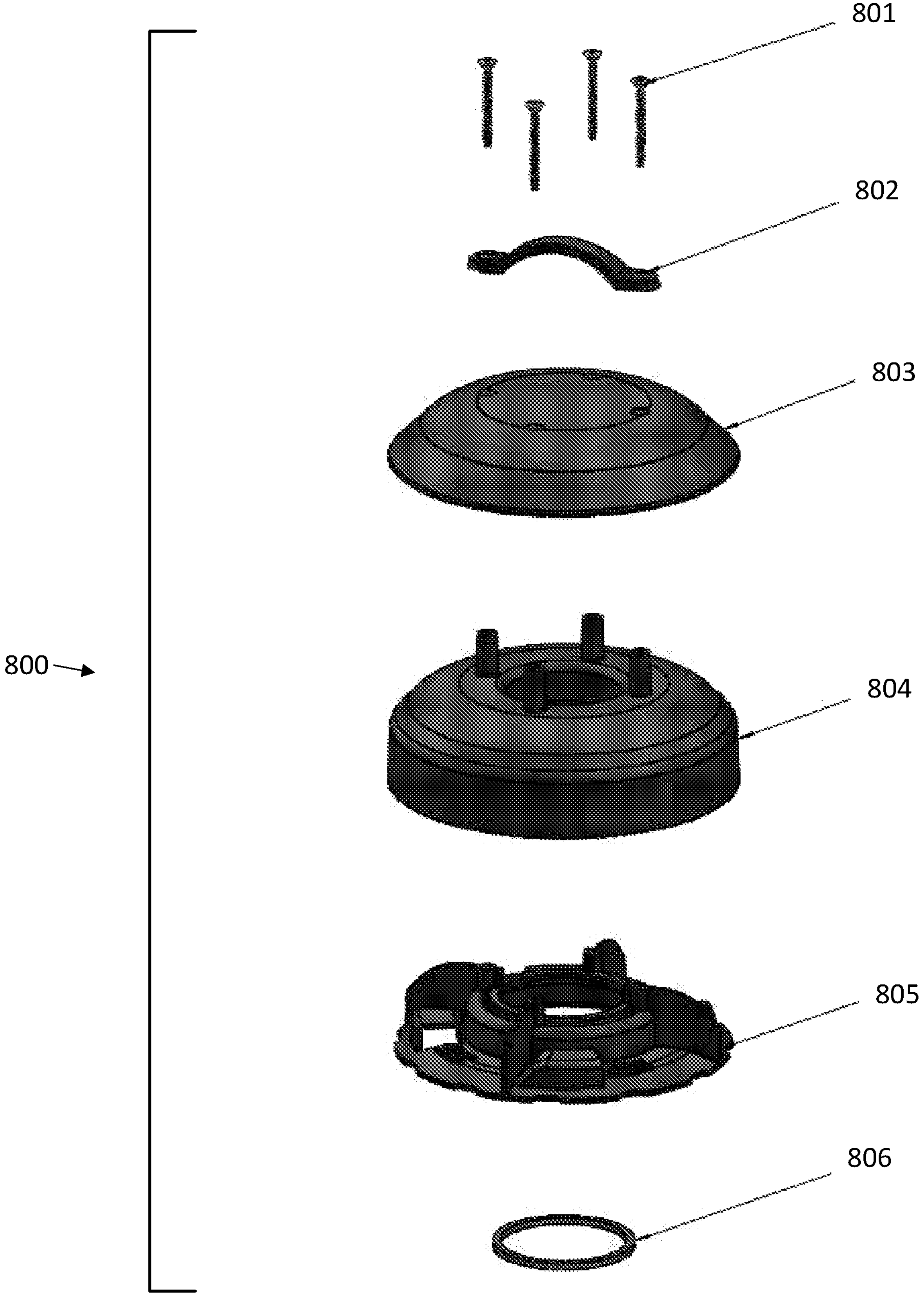
FIG. 8 shows an exploded view of a removable omni-directional inlet assembly, according to an exemplary embodiment of the present subject disclosure.

FIG. 8 shows an exploded view of a removable omni-directional inlet assembly 800, according to an exemplary embodiment of the present subject disclosure. Removable omni-directional inlet assembly 800 is assembled using four screws 801 to hold together hang loop 802, inlet lid 803, inlet top cover 804, and inlet bottom cover 805. Gasket 806 is bonded into a filter seat in the bottom side of inlet bottom cover 805.

Inlet lid 803, inlet top cover 804, and inlet bottom cover 805 are made from conductive injection molded plastic to provide a conductive flow-path from the inlet opening to the face of the collection filter. This configuration reduces losses of particles to the flow path walls.

Gasket 806 provides a compliant surface for sealing of the filter into the inlet assembly when it is attached to the collector body. Inlet bottom cover 805 contains four pockets that interlock with clips on the top side of the collector body. These pockets, along with the clips, enable the removable omni-directional inlet assembly 800 to be easily attached and removed from the collector body.

Figure 9:
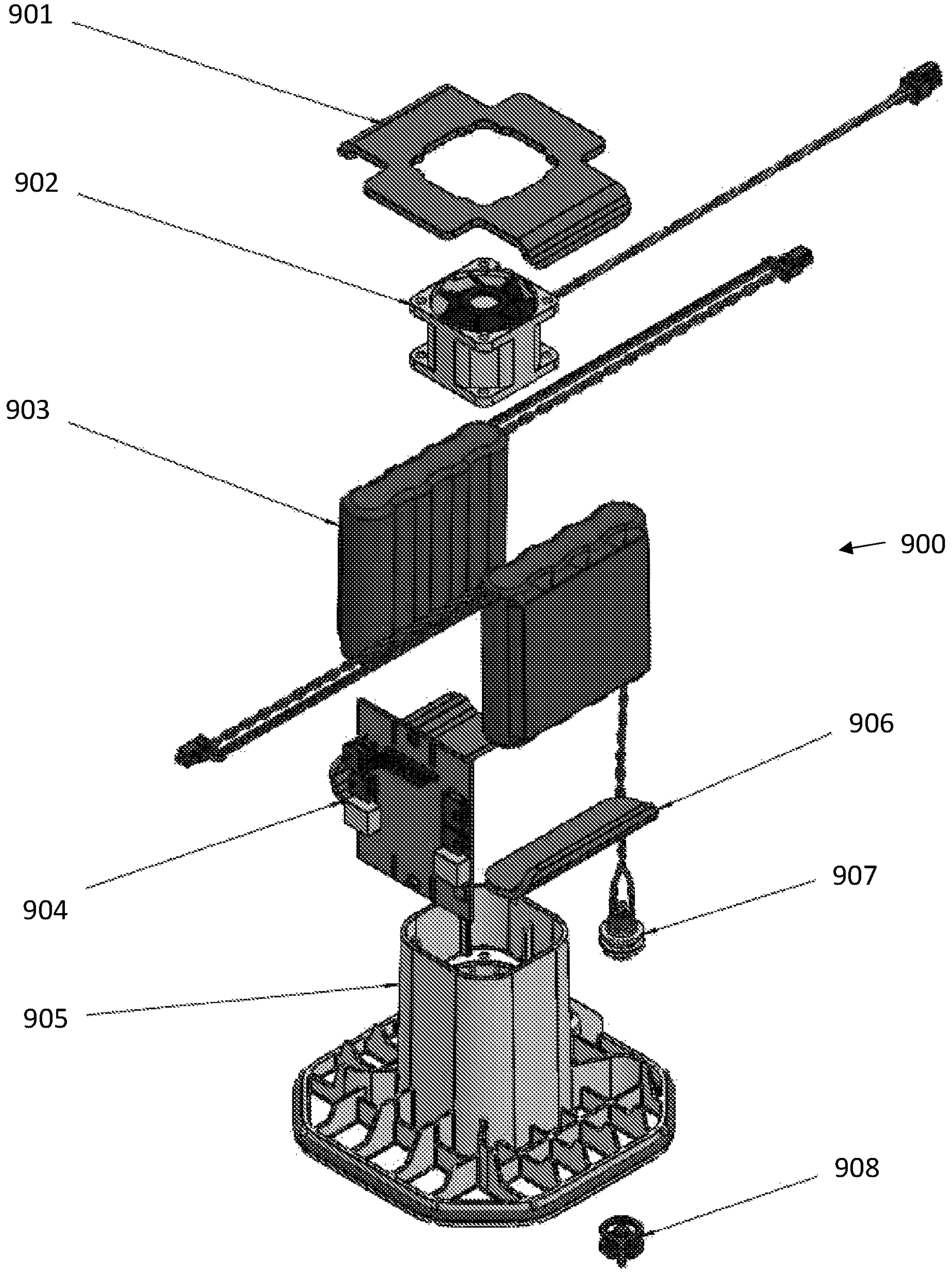
FIG. 9 shows an exploded view of an electronics assembly of a battery-powered aerosol collector, according to an exemplary embodiment of the present subject disclosure.

FIG. 9 shows an exploded view of an electronics assembly 900 of a battery-powered aerosol collector, according to an exemplary embodiment of the present subject disclosure. Electronics assembly 900 contains top adhesive gasket 901, fan 902, two battery packs 903, control board 904, collector body bottom 905, bottom adhesive gasket 906, connector 907 and connector cover 908. Fan 902 is an axial or inline fan centered between two battery packs 903. This symmetrical assembly enables a compact and weight balanced aerosol collector. Electronics in control board 904 and in the two battery packs 903 along with power supply connector 907 enable battery or wall power operation.

Figure 10:
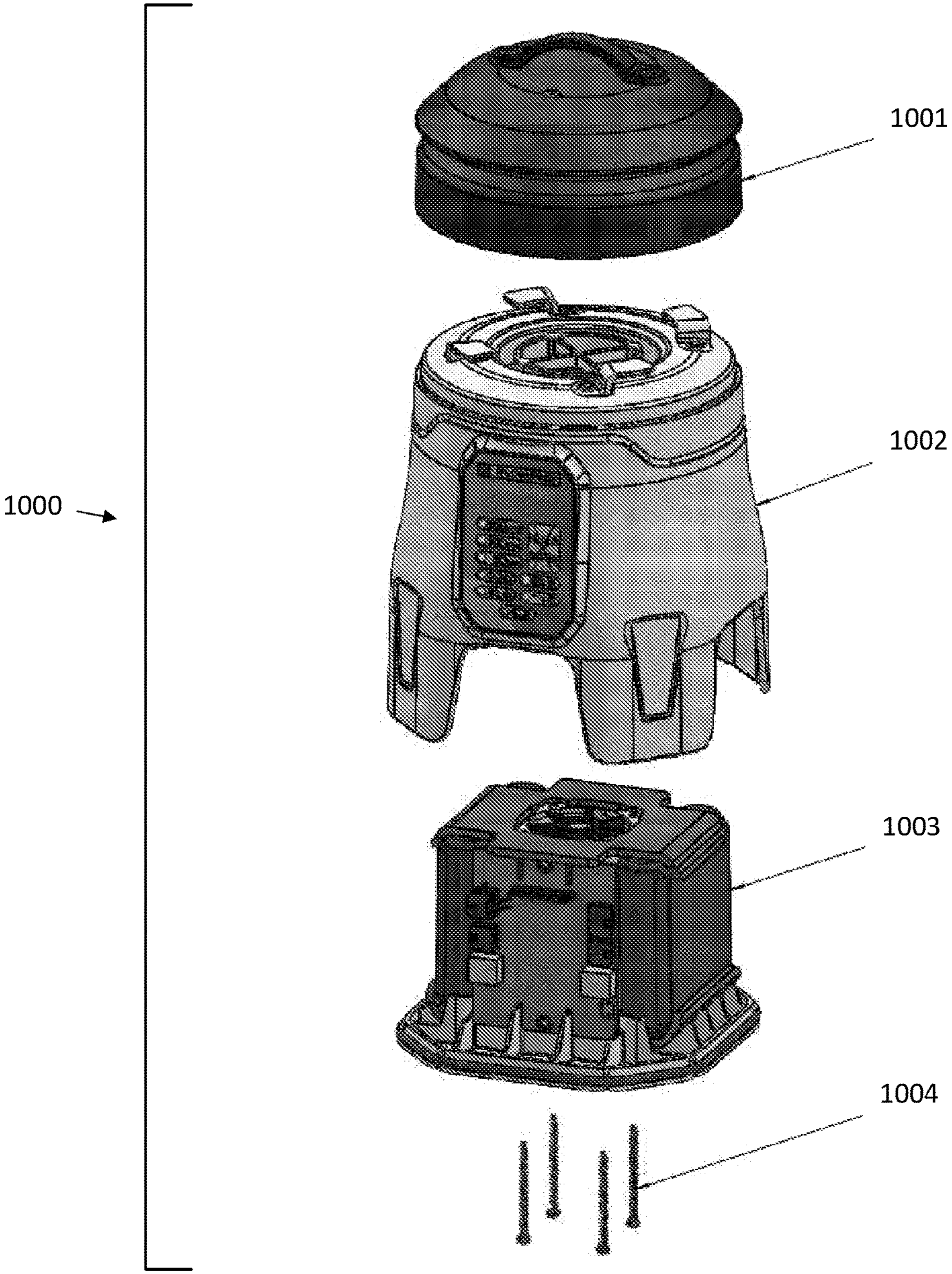
FIG. 10 shows an exploded view of a battery-powered aerosol collector with removable omni-directional inlet assembly, according to an exemplary embodiment of the present subject disclosure.

FIG. 10 shows an exploded view of a battery-powered aerosol collector 1000 with removable omni-directional inlet assembly 1001, according to an exemplary embodiment of the present subject disclosure. Electronics assembly 1003 contains two battery packs, a control board and gaskets to hold the battery packs in place after assembly of the aerosol collector 1000. To assemble the battery-powered aerosol collector 1000, collector body 1002 is slid over electronics assembly 1003 and four screws 1004 are inserted. After assembly, removable omni-directional inlet assembly 1001 may be attached to the collector body 1002.

Figure 11:
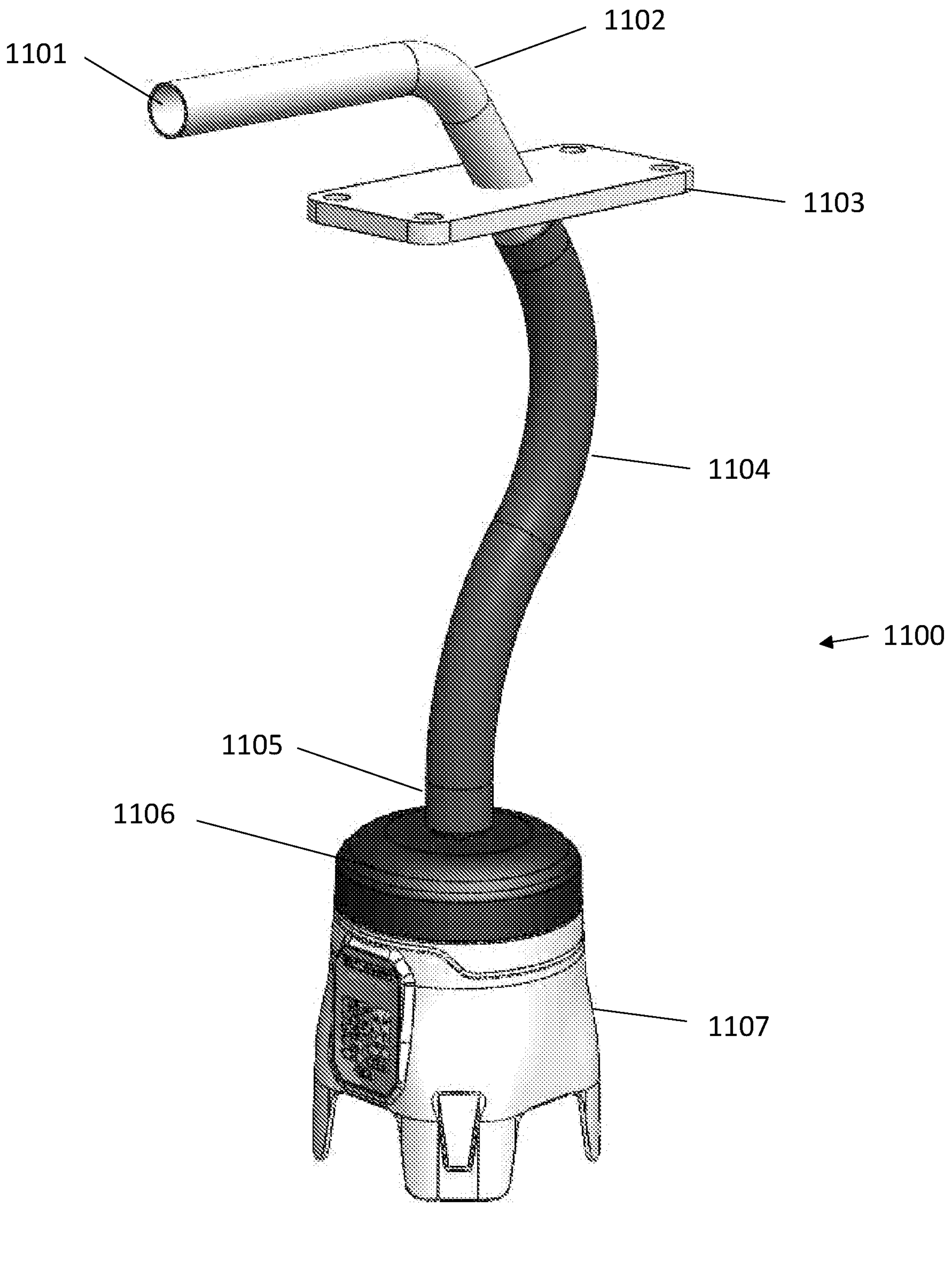
FIG. 11 shows an aerosol collector with removable inlet assembly and probe for sampling from airstreams, according to an exemplary embodiment of the present subject disclosure.

FIG. 11 shows an aerosol collector 1100 with removable inlet assembly 1106 and probe 1102 for sampling from airstreams, according to an exemplary embodiment of the present subject disclosure. Aerosol collector 1100 contains collector body 1107 with removable inlet assembly 1106 and hose barb 1105, attached hose 1104, mounting plate 1103, probe 1102, and probe inlet 1101.

Removable inlet assembly 1106 can be removed from collector body 1107 with a ¼-turn and a filter can be placed into an internal filter seat. Removable inlet assembly 1106 is preferably manufactured by injection molding with a conductive plastic. The design of the inlet assembly, along with being manufactured with injection molded conductive plastic, ensures that the entire flow path up to the filter is made of smooth, conductive material. This approach helps minimize losses to the inlet surfaces due to electrostatic collection and therefor ensures high efficiency transmission of particles to the filter.

Removable inlet assembly 1106 has a hose barb 1105 for attachment of a hose 1104 of varying lengths. Hose 1104 transmits air and entrained particles from probe 1102 to removable inlet assembly 1106 and to the collection filter. Probe 1102 can be placed into an air handling duct, wind tunnel, or other air moving path and attached using mounting plate 1103. The probe 1102 and probe inlet 1101 may be sized as necessary to ensure good particle transmission, low pressure, and isokinetic sampling in the flow path as necessary. Further, mounting plate 1103 may be used to mount probe 1102 to a vehicle, boat, or aircraft to enable sampling from an air stream while moving.

Figure 12:
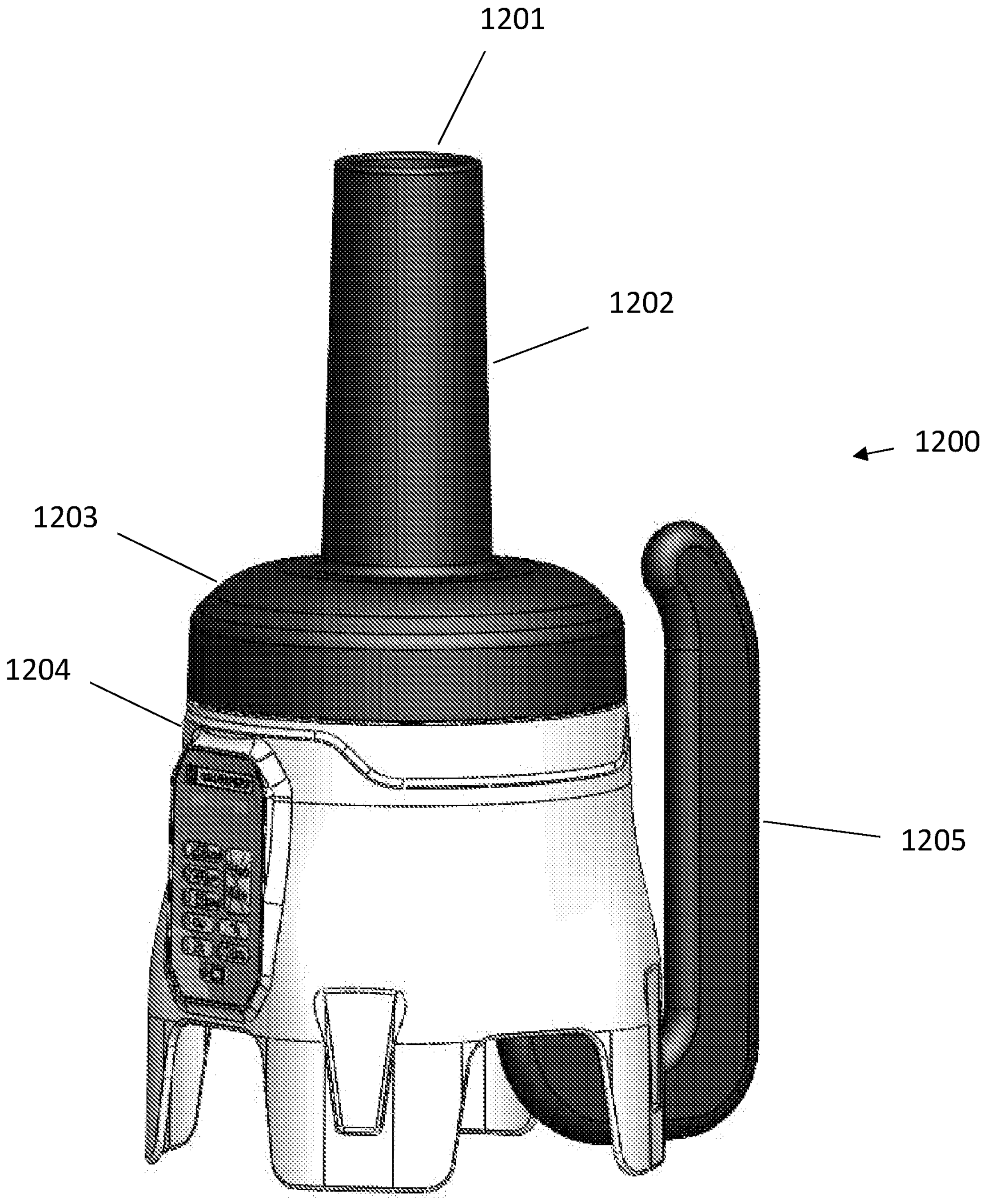
FIG. 12 shows an aerosol collector with removable directional inlet assembly and handle for mobile, hand-held sampling, according to an exemplary embodiment of the present subject disclosure.

FIG. 12 shows an aerosol collector 1200 with removable directional inlet assembly 1203 and handle 1205 for mobile, hand-held sampling, according to an exemplary embodiment of the present subject disclosure. Aerosol collector 1200 contains collector body 1204 with removable inlet assembly 1203 and handle 1205. Removable inlet assembly 1203 is attached to collector body 1204 and contains directional inlet 1202 and inlet opening 1201. This configuration allows a user to utilize aerosol collector 1200 as a handheld device for directional close-range sampling and when auditing or walking through facilities or locations.

The aerosol collectors, as disclosed, advance the art of aerosol and bioaerosol collection by providing a high flow rate and high efficiency collector at a lower cost and with features that improve sample collection while reducing the potential for cross contamination between samples. The aerosol collector uses an axial or inline fan and two batteries to provide a compact configuration, and an outer body shell and removal inlet assembly that are symmetrical around a central vertical axis—with the exception of the user interface and the power supply port and tripod port. This design makes assembly of the aerosol collector straightforward and the assembled unit well balanced due to the use of two separate batteries.

In addition to the use of an axial or inline fan, other fan types can be used that will be apparent to those skilled in the art after consideration of the present disclosure. These include, but are not limited to, propeller, centrifugal, radial, mixed flow, and cross flow fans.

Flow through the aerosol collector can be controlled using any number of approaches that will be apparent to those skilled in the art including, but not limited to, the methods described herein. A flow sensor and pulse width modulation (PWM) may be used to control the speed of the fan and thus the flowrate through the aerosol collector and filter. The fan may be controlled to a set revolutions per minute (RPM) using PWM for control and an onboard tachometer for RPM feedback. Additionally, the flow may be controlled using voltage control against feedback from a flow sensor or tachometer. A current feedback can also be used to monitor the flow rate. Look up tables or an application may be provided to the customer to enable conversion to standard flow rate.

The compact nature of the device and the symmetry around a central vertical axis allows the removable inlet assembly to be roughly the same diameter as the collector body, thus reducing bluff body effects of the collector body itself. Thus, the collector body itself does not affect flow of air into the omnidirectional inlet opening due to potential turbulence created by the collector body in flowing air.

The removable inlet assembly is generally constructed of conductive injection molded plastic to reduce the overall manufacturing cost of the aerosol collector while reducing electrostatic collection forces. This enables high particle transport efficiency in the inlet assembly. Conductive plastics commonly include carbon, stainless steel, or other metal particle or fiber fillers, but any conductive injection molded or formed plastic material that will be apparent to those skilled in the art may be used. Further, the inlet assembly may be constructed from non-conductive plastic and coated with a conductive material along the inlet opening and interior flow path. Finally, the inlet assembly may be constructed from metals or other conductive materials using traditional or 3d printing approaches that will be apparent to those skilled in the art.

A number of different removable inlet assemblies may be constructed for use with the aerosol collector. These include, but are not limited to: omnidirectional; directional; sampling probes; vacuum style wands for collection of dry materials from surfaces or for vacuuming of surfaces including hard surfaces or carpets; probes for close proximity sampling from particle sources such as animals, industrial sources, or other point sources; active vane type inlets; particle separating inlets such as those using impaction or centrifugal forces to remove larger particles prior to collection onto the filter; and other inlet types that will be apparent to those skilled in the art.

The removable inlet assembly contains the entire flow path up to the collection filter. In this way all air and entrained particles and gasses pass through the filter only come into contact with the removable inlet assembly flow path. The removable inlet assembly contains no electronic components and as such can be removed from the aerosol collector and decontaminated by wiping down, submerging in a decontamination or cleaning fluid, placed into a dishwasher, placed into a gaseous sterilizer such as ethylene oxide or vaporous hydrogen peroxide or others that will be apparent to those skilled in the art, autoclaved, or cleaned, sterilized, or decontaminated in any other number of ways that will be apparent to those skilled in the art.

The removable inlet assembly is easily removed and can be replaced by another already clean removable inlet assembly. This enables the user to quickly and easily provide a clean inlet flow path between sample collection runs, such that the potential for cross contamination between samples is greatly reduced or eliminated. Further, removal inlet assemblies of one type can easily be replace with an inlet assemble of another type for other sampling scenarios. The modular nature of these assemblies enables use of the appropriate inlet type for each sampling scenario.

The collector body is sealed using gaskets and O-rings and the fan and electronics, control board, and connectors can be sealed using methods that will be known to those skilled in the art. This allows the aerosol collector to meet appropriate requirements for operation in outdoor environments.

As employed in this specification and annexed drawings, the term “or” is intended to mean an inclusive “or” rather than an exclusive “or.” Moreover, articles “a” and “an” as used in the subject specification and annexed drawings should generally be construed to mean “one or more” unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiments described herein but is intended to cover all modifications and changes within the scope and spirit of the subject disclosure.

What is claimed is:

1. A device for collecting aerosols and bioaerosols, the device comprising:

a collector body;

a modular filter positioned atop the collector body; and a modular inlet assembly positioned atop the modular filter and reversibly connectable with the collector body, wherein the modular inlet assembly contains:

a single inlet opening that is complete and undivided; and a complete fluid flow path, in its entirety, from the single inlet opening to a collection face of the modular filter; and wherein the modular inlet assembly comprises:

an inlet lid;

a top cover; and a bottom cover, wherein interior surfaces of the inlet lid, the top cover, and the bottom cover assembled together define a single plenum that contains the entirety of the complete fluid flow path from the single inlet opening to the collection face of the modular filter.

2. The device in claim 1, wherein the modular inlet assembly completely attached to the collector body is removable to be completely detached from the collector body by only a quarter-turn, and the modular inlet assembly completely detached from the collector body is connectable to be completely attached to the collector body by only a quarter-turn.

3. The device in claim 2, wherein each quarter-turn is created by disengaging and engaging clips on a top side of the collector body that interlock with corresponding pockets on a bottom side of the modular inlet assembly.

4. The device in claim 1, wherein the modular inlet assembly is constructed from injection molded conductive plastic.

5. The device in claim 1, wherein the modular inlet assembly is constructed from injection molded plastic with a conductive coating on a surface that comprises the flow path.

6. The device in claim 1, wherein the modular inlet assembly is an omnidirectional inlet.

7. The device in claim 1, wherein the modular inlet assembly is a directional inlet.

8. The device in claim 7, wherein the modular inlet assembly is an active, vane-type inlet.

9. The device in claim 7, wherein the modular inlet assembly is a bent sampling probe.

10. The device in claim 7, wherein a flexible hose attaches to the modular inlet assembly and a sampling probe or nozzle can be attached to the hose.

11. The device in claim 1, wherein the modular inlet assembly contains a hang loop.

12. The device in claim 1, further comprising a fan positioned in the collector body to bring in fluid into the modular inlet assembly.

13. The device in claim 1, wherein the single inlet opening is formed by an annular gap disposed between the inlet lid and the top cover about a circumference of the modular inlet assembly constructed as an omnidirectional inlet.

14. The device in claim 1, wherein the modular filter is an electret filter.

15. The device in claim 1, further comprising an integrated handle on the collector body that allows the device to be carried while sampling.

16. The device in claim 1, further comprising a tripod port located on an underside of the collector body.

17. A device for collecting aerosols and bioaerosols, the device comprising:

a collector body having a vertical central axis;

a modular filter positioned atop the collector body and having a center on the vertical central axis of the collector body;

a modular inlet assembly having a center on the vertical central axis of the collector body, positioned atop the modular filter, and reversibly connectable in direct attachment with and upon the collector body;

a fan positioned in the collector body and adapted with the modular inlet assembly to create a complete fluid flow path, wherein fluid flows omnidirectionally from a single inlet opening of the modular inlet assembly in an inward flow direction along flow path walls perpendicular with the vertical central axis, and then flows undividedly to a sample collection face of the modular filter in a downward flow direction along flow path walls parallel with the vertical central axis; and wherein fluid flowing through the complete fluid flow path from the single inlet opening to the sample collection face only comes into contact with flow path walls.

18. The device in claim 17, wherein the collector body and the modular inlet assembly are symmetrical around the vertical central axis, and the single inlet opening is contained by the modular inlet assembly having the same diameter as the adjacent collector body.

19. A device for collecting aerosols and bioaerosols, the device comprising:

a collector body;

a modular filter positioned atop the collector body;

a modular inlet assembly positioned atop the modular filter and contains:

a single inlet opening that is complete and undivided;

an entire fluid flow path from the single inlet opening to a sample collection face of the modular filter; and wherein the modular inlet assembly is reversibly connectable for direct attachment with and upon the collector body by only a quarter-turn, and can be replaced with a second modular inlet assembly that is an omnidirectional inlet, a directional inlet, an active vane type inlet, or a bent sampling probe.

20. The device of claim 19, wherein the modular inlet assembly attached to the collector body is removable from the collector body by disengaging clips on a top side of the collector body with pockets on a bottom side of the modular inlet assembly, and the modular inlet assembly removed from the collector body is connectable to the collector body by engaging the clips with the pockets.

* * * * *